US008419850B2

United States Patent
Trouve

(10) Patent No.: US 8,419,850 B2
(45) Date of Patent: Apr. 16, 2013

(54) AQUEOUS COMPOSITION CONTAINING A CARBONATE OF ZIRCONIUM AND OF AN ALKALINE METAL SALT, AND AN AMMONIUM HALIDE, AS WELL AS ITS USE THEREOF

(75) Inventor: Claude Trouve, Paris (FR)

(73) Assignee: Clariant Finance (BVI) Limited, Tortola (VG)

(*) Notice: Subject to any disclaimer, the term of this patent is extended or adjusted under 35 U.S.C. 154(b) by 177 days.

(21) Appl. No.: 12/669,438

(22) PCT Filed: Jul. 14, 2008

(86) PCT No.: PCT/EP2008/059169
§ 371 (c)(1),
(2), (4) Date: Jul. 2, 2010

(87) PCT Pub. No.: WO2009/010490
PCT Pub. Date: Jan. 22, 2009

(65) Prior Publication Data
US 2010/0263573 A1    Oct. 21, 2010

(30) Foreign Application Priority Data

Jul. 17, 2007  (FR) .................................. 07 56550

(51) Int. Cl.
*D21H 21/20* (2006.01)

(52) U.S. Cl.
USPC ...................................... 106/286.4

(58) Field of Classification Search .................. None
See application file for complete search history.

(56) References Cited

U.S. PATENT DOCUMENTS

| 3,298,957 | A | | 1/1967 | Gens |
| 3,741,782 | A | * | 6/1973 | Stewart et al. ............. 106/217.9 |
| 4,021,398 | A | | 5/1977 | Gilman et al. |
| 4,061,720 | A | | 12/1977 | Phillips |
| 4,360,507 | A | * | 11/1982 | McArthur et al. ......... 423/420.2 |
| 4,737,491 | A | | 4/1988 | Leppavuori |
| 4,844,970 | A | | 7/1989 | Goldstein et al. |
| 5,733,666 | A | | 3/1998 | Sinko |
| 5,759,705 | A | | 6/1998 | Sinko |
| 6,113,989 | A | | 9/2000 | Sinko |
| 2010/0227074 | A1 | | 9/2010 | Trouve |

FOREIGN PATENT DOCUMENTS

| EP | 0004403 | 10/1979 |
| FR | 1378117 | 11/1964 |
| FR | 2088550 | 1/1972 |
| FR | 2156879 | 6/1973 |
| GB | 1001997 | 8/1965 |
| GB | 1373634 | 11/1974 |

OTHER PUBLICATIONS

PCT International Search Report for PCT/EP2008/059169, Jan. 23, 2009.
PCT International Preliminary Report on Patentability for PCT/EP2008/059169, Oct. 23, 2009.
PCT International Search Report for PCT/EP2008/052940, Jun. 19, 2008.
Written Opinion of the International Searching Authority for PCT/EP2008/052940, Jun. 19, 2008.
Aqueous Chemistry of Zirconium(IV) in Carbonate Media, Helvetica Chimica Acta, 83, 414-427, (2000).

* cited by examiner

*Primary Examiner* — Melvin C Mayes
*Assistant Examiner* — Stefanie Cohen
(74) *Attorney, Agent, or Firm* — Tod A. Waldrop; Anthony A. Bisulca

(57) ABSTRACT

The invention relates to an aqueous composition comprising a carbonate of zirconium and of an alkali metal salt, prepared from a zirconium compound and an alkali metal bicarbonate, and an ammonium halide, and to its use as insolubilizing agent in a coating bath for paper or board.

15 Claims, No Drawings

AQUEOUS COMPOSITION CONTAINING A CARBONATE OF ZIRCONIUM AND OF AN ALKALINE METAL SALT, AND AN AMMONIUM HALIDE, AS WELL AS ITS USE THEREOF

The present invention relates to an aqueous composition comprising a carbonate of zirconium and of an alkali metal salt and an ammonium halide, and to the use of the said composition as insolubilizing agent in coating baths for paper or board.

It is known that aqueous compositions of ammonium zirconium carbonate (AZC) can be used to render insoluble, in aqueous solution, natural binders, such as starch, casein or carboxymethylcellulose (CMC), or synthetic binders, such as latexes or polyvinyl alcohol, and to form insoluble films, thus improving the resistance to water, to friction, to heat and to solvents.

These zirconium carbonate solutions are used in numerous technological fields, in particular in aqueous ink and paint formulations and more particularly in coating baths intended for the coating or impregnation of paper or board in order to improve the appearance, the wet abrasion resistance, the picking, the strength and the ability to receive printing.

However, the use of these solutions has the disadvantage of releasing a strong smell of ammonia when the latter are employed.

One solution provided is the use of aqueous solutions of zirconium carbonate and of an alkali metal salt, such as of sodium or potassium. However, the use of these compositions does not give satisfactory results, particularly as regards the resistance of the coating to wet rub.

U.S. Pat. No. 6,113,989 indicates that aqueous alkaline solutions of sodium, potassium or ammonium and zirconium carbonate used in compositions for preventing the colouring of wood can be modified by the addition of anionic entities, such as Cl ions.

FR 1 378 117 teaches that the addition of a small amount of ammonium chloride to aqueous solutions of ammonium zirconium carbonate appears to improve the performance of the said solution in compositions for the coating of paper.

Surprisingly, it has now been found that the addition of an ammonium halide to an aqueous solution of carbonate of zirconium and of an alkali metal salt makes it possible to obtain resistances to wet rub which are comparable to aqueous AZC solutions, this being the case even for coating baths having high pH values.

A subject-matter of the present invention is thus an aqueous composition comprising a carbonate of zirconium and of an alkali metal salt, prepared from a zirconium compound and from an alkali metal bicarbonate with a bicarbonate to zirconium molar ratio equal to or greater than 4:1, and an ammonium halide with a halide to zirconium molar ratio equal to or greater than 2:1.

The term "zirconium compound" denotes basic zirconium carbonate, also known as BZC or ZBC, zirconium oxychloride ($ZrOCl_2$), also known as ZOC, and basic zirconium sulphate, also known as BZS, basic zirconium carbonate being preferred.

The term "alkali metal bicarbonate" denotes sodium bicarbonate or potassium bicarbonate, potassium bicarbonate being preferred.

The ammonium halide can be chosen from ammonium chloride, ammonium bromide, ammonium fluoride, ammonium iodide or their mixtures. Ammonium chloride ($NH_4Cl$) is preferred.

The halide to zirconium molar ratio in the aqueous composition is equal to or greater than 2:1, preferably between 2:1 and 5:1, preferentially between 2.5:1 and 3.5:1 and very particularly equal to 3:1.

The bicarbonate to zirconium molar ratio during the preparation of the carbonate of zirconium and of an alkali metal salt is equal to or greater than 4:1, preferably between 4:1 and 6:1, and preferably equal to 4:1.

The aqueous compositions of the present invention have a pH of greater than 7 and of less than 10, preferably of between 8 and 9, a concentration of 4 to 12% by weight, expressed as $ZrO_2$, preferably a concentration of 7 to 10% by weight, expressed as $ZrO_2$, and a solids content of 11 to 42%, preferably of 30 to 36%.

The basic zirconium carbonate, the zirconium oxychloride and the basic zirconium sulphate which can be used according to the invention are commercial products generally available in the solid and hydrate form. Advantageously, the basic zirconium carbonate will be used in the powder form as sold by Astron.

Typically, the compositions of the present invention are prepared by reaction of the zirconium compound with an aqueous solution of alkali metal bicarbonate, followed by addition of the ammonium halide.

Another subject-matter of the invention is a process for the preparation of an aqueous composition comprising a carbonate of zirconium and of an alkali metal salt, prepared from a zirconium compound and from an alkali metal bicarbonate, and an ammonium halide, as described above, comprising a stage consisting in reacting the zirconium compound with an aqueous solution of alkali metal bicarbonate, with a bicarbonate to zirconium molar ratio equal to or greater than 4:1, and a stage of addition of the ammonium halide, with a halide to zirconium molar ratio equal to or greater than 2:1.

The reaction of the zirconium compound with the alkali metal bicarbonate can be carried out at ambient temperature but it is facilitated by heating.

According to a preferred embodiment, after having added, at ambient temperature, the zirconium compound to the aqueous solution of alkali metal bicarbonate, the solution obtained is brought with stirring to a temperature of between 30 and 80° C., preferably to 70° C., for 1 h to 24 h, preferably 4 h.

Conventionally, the ammonium halide is added to the solution obtained above at ambient temperature and then stirring is allowed to take place until the ammonium halide has completely dissolved.

The stability of the aqueous compositions of the present invention can be improved by the addition of a stabilizing agent as described in FR-A-2 088 550. Mention may be made, by way of example, of tartaric acid or gluconic acid, which is advantageously added in the proportion of 1 to 2% approximately with respect to the weight of the final solution. The tartaric or gluconic acid can be added before the reaction between the zirconium compound and the alkali metal bicarbonate or after the addition of the ammonium halide, preferably before the reaction.

The compositions obtained according to the invention are stable over time and exhibit advantageous properties when they are introduced into compositions for the treatment of cellulose-based products, in particular into coating baths.

They make it possible in particular to improve the wet abrasion resistance, the wet pick resistance and the inertia with regard to water of the substrates treated, such as paper or board, such as, for example, paper of the type for the printing of writing, newsprint, recycled paper, wrapping paper, paper of test liner type, the backing for self-adhesive labels or board in the flat.

Another subject-matter of the invention is thus the use of these compositions as insolubilizing agent in an aqueous composition for the treatment of a cellulose-based product, preferably paper or board.

In the present invention, the coating bath can be:
- either deposited at the surface over the cellulose-based product in one or more layers while limiting the penetration inside the surface to be treated, an operation commonly known as coating;
- or brought into contact with the cellulose-based product with the objective of obtaining penetration inside the cellulose-based product in one or more stages, an operation commonly known as impregnation.

In particular, another subject-matter of the invention is a method for treating a cellulose-based product, preferably paper or board, in which a coating bath comprising at least one binder, an insolubilizing agent and optionally a pigment is applied at the surface of the said cellulose-based product, characterized in that the insolubilizing agent is an aqueous composition comprising a carbonate of zirconium and of an alkali metal salt and an ammonium halide, as described above.

According to another aspect, the invention is also targeted at a method for treating a cellulose-based product, preferably paper or board, in which a coating bath comprising at least one binder, an insolubilizing agent and optionally a pigment is brought into contact with the said cellulose-based product, characterized in that that the insolubilizing agent is an aqueous composition comprising a carbonate of zirconium and of an alkali metal salt and an ammonium halide, as described above.

According to a preferred aspect for implementing the invention, the insolubilizing agent is an aqueous composition comprising a potassium zirconium carbonate and ammonium chloride.

A coating bath is an aqueous mixture comprising at least one binder, an insolubilizing agent and optionally a pigment, and also, optionally, functional additives. Generally, the pigments used are chosen from kaolin, calcium carbonate, titanium dioxide and their mixtures. Other pigments, such as alumina hydrate, satin white, silicates or synthetic pigments, can also be used for specific applications.

The binders can be of natural or synthetic origin.

Mention may be made, among natural binders, of starch, modified starch (for example oxidized or modified by enzymes), soy protein and casein.

More commonly, use is made of synthetic binders, such as styrene/butadiene latexes, polyvinyl acetate latexes, acrylate latexes or polyvinyl alcohol.

According to a preferred aspect, the binders used in the present invention can be chosen from functionally modified latexes, for example latexes modified with hydroxyl groups, particularly with carboxyl groups, in particular sodium carboxylate groups. Mention may be made, by way of example, of the styrene/butadiene DL 950 latex sold by Dow.

The coating baths which can be used in the present invention can also comprise additives, such as dispersants, viscosity modifiers (carboxymethylcellulose or hydroxyethylcellulose, for example), lubricating agents, bactericides, pH control agents, repellants, gloss agents, dyes or antifoaming agents.

The pH of the said coating baths is generally between 7 and 9, preferably between 7 and 8.6.

Generally, the amount of insolubilizing agent of the present invention in the coating bath is between 1 and 20 parts as is per 100 parts of binder under dry conditions, preferably between 3 and 15 parts as is per 100 parts of binder under dry conditions.

The coating bath is applied by methods known per se. Mention may be made, by way of example, of the process with an applicator roll, size press or premetering size press.

The invention is illustrated without implied limitation by the following examples.

EXAMPLE 1

Preparation of a potassium zirconium carbonate solution comprising 8.5% of dry $ZrO_2$ with regard to the solution as is and 4 mol of bicarbonate per mole of zirconium.

0.78 g of tartaric acid is added to 41.32 g of water with stirring and at ambient temperature. Subsequently, 26.70 g of potassium bicarbonate are added, followed by 20.50 g of basic zirconium carbonate (38 to 42% of $ZrO_2$; Astron). When the addition is complete, the solution is heated at 70° C. for 3 hours.

The solution is cooled to 30° C. and 10.70 g of ammonium chloride are added with stirring. Stirring is maintained until the ammonium chloride has completely dissolved.

100 g of a clear colourless solution having a slight smell of ammonia, a pH of approximately 8.2, a solids content of 32.8% and an NTU turbidity of 6 are obtained.

APPLICATION EXAMPLE

Use was made of a calcium carbonate sold by Omya (Hydrocarb® 90), a kaolin sold by Huber Engineered Materials (Hydragloss®), a styrene/butadiene latex sold by Dow (DL 950), and carboxymethylcellulose (CMC) sold by Noviant (Finfix® 10).

Various formulations C1 to C4 were prepared, the compositions of which are given in Table 1 below. The amounts are given as dry parts.

The formulation C1 does not comprise an insolubilizing agent.

The formulation C2 corresponds to the use of an insolubilizing composition according to the invention (Example 1).

The formulation C3 corresponds to the use of a commercial aqueous ammonium zirconium carbonate composition comprising 19% of dry $ZrO_2$ with regard to the solution as is, a solids content of 30.85% and a pH of 9.5.

The formulation C4 corresponds to the use of an aqueous potassium zirconium carbonate solution prepared according to the procedure of Example 1 but without addition of ammonium chloride, comprising 11% of dry $ZrO_2$ with regard to the solution as is, a solids content of 53.7% and a pH of 9.

TABLE 1

| | C1 | C2 | C3 | C4 |
|---|---|---|---|---|
| calcium carbonate | 50 | 50 | | |
| kaolin | 50 | 50 | 50 | 50 |
| latex | 10 | 10 | 10 | 10 |
| CMC | 0.35 | 0.35 | 0.35 | 0.35 |
| insolubilizing agent (Example 1) | | 0.9 | | |
| insolubilizing agent AZC | | | 0.2 | |
| insolubilizing agent (without additive) | | | | 1.2 |
| pH | 8.98 | 8.45 | 9.17 | 8.8 |

In the examples, use was made of uncoated paper exhibiting a grammage of 80 g/m².

The paper was coated with the formulations C1 to C4 with a deposition of approximately 26 g/m² using a threaded rod, followed by oven drying at 105° C. in an oven for 2 minutes.

The Taber wet abrasion was subsequently determined on the coated paper.

The Taber wet abrasion was carried out according to amended French Standard Q 03-055, with annular test specimens with outer and inner diameters of 120 and 7 mm respectively, with 10 revolutions, CS O wheels, under a pressure of 1N, in the presence of 10 ml of water, followed by rinsing with 10 ml of water; these 20 ml of water are collected and made up to 25 ml with water and then the turbidity of these 25 ml of water is determined with a Hach turbidimeter. The turbidity found is expressed in NTU units (the lower the turbidity values, the better the resistance) and the results obtained are reported in Table 2 below.

TABLE 2

|  | C1 | C2 | C3 | C4 |
|---|---|---|---|---|
| Turbidity (NTU) | 237 | 42 | 120 | 165 |

The analysis of the results mentioned in Table 2 shows that, with respect to the coating slips prepared according to the techniques of the prior art, with an equivalent dose of $ZrO_2$ as dry part, the insolubilizing composition C2 according to the invention makes it possible to obtain a coated paper exhibiting a better wet abrasion resistance.

Other advantages of the present invention are a very rapid preparation and only a very slight smell of ammonia in comparison with an aqueous ammonium zirconium carbonate solution.

The invention claimed is:

1. An aqueous composition, wherein the aqueous composition is a solution and comprises a carbonate of zirconium and of an alkali metal salt, prepared from a zirconium compound and from an alkali metal bicarbonate with a bicarbonate to zirconium molar ratio equal to or greater than 4:1, and an ammonium halide with a halide to zirconium molar ratio equal to or greater than 2:1.

2. The composition according to claim 1, wherein the zirconium compound is basic zirconium carbonate, zirconium oxychloride ($ZrOCl_2$) or basic zirconium sulphate, the alkali metal bicarbonate is potassium bicarbonate or sodium bicarbonate, and the ammonium halide is ammonium chloride, ammonium bromide, ammonium fluoride, ammonium iodide or mixtures thereof.

3. The composition according to claim 2, wherein the zirconium compound is a basic zirconium carbonate, the alkali metal bicarbonate is a potassium bicarbonate and the ammonium halide is ammonium chloride.

4. The composition according to claim 1, wherein the halide to zirconium molar ratio is between 2:1 and 5:1 and the bicarbonate to zirconium molar ratio is between 4:1 and 6:1.

5. The composition according to claim 4, wherein the halide to zirconium molar ratio is between 2.5:1 and 3.5:1 and the bicarbonate to zirconium molar ratio is equal to 4:1.

6. The composition according to claim 1, wherein the pH of the said composition is greater than 7 and less than 10 and that the concentration, expressed as $ZrO_2$, is from 4 to 12% by weight.

7. The composition according to claim 1, further comprising a stabilizing agent.

8. A process for the preparation of a composition according to claim 1, comprising the steps of reacting the zirconium compound with an aqueous solution of alkali metal bicarbonate, with a bicarbonate to zirconium molar ratio equal to or greater than 4:1, and adding the ammonium halide, with a halide to zirconium molar ratio equal to or greater than 2:1.

9. The process according to claim 8, wherein the zirconium compound is basic zirconium carbonate, zirconium oxychloride ($ZrOCl_2$) and basic zirconium sulphate, the alkali metal bicarbonate is potassium bicarbonate or sodium bicarbonate, and the ammonium halide is ammonium chloride, ammonium bromide, ammonium fluoride, ammonium iodide or mixtures thereof.

10. The process according to claim 9, wherein the zirconium compound is basic zirconium carbonate, the alkali metal bicarbonate is potassium bicarbonate and the ammonium halide is ammonium chloride.

11. The process according to claim 9, further comprising the adding a stabilizing agent.

12. An insolubilizing agent in an aqueous composition for the treatment of a cellulose-based product comprising a composition according to claim 1.

13. The insolubilizing agent according to claim 12, wherein the cellulose-based product is paper or board.

14. The insolubilizing agent according to claim 12, wherein the treatment of a cellulose-based product is a coating bath.

15. The insolubilizing agent according to claim 14, wherein the coating bath is intended for the impregnation or coating of paper or board.

* * * * *